United States Patent
Du et al.

(10) Patent No.: US 9,578,630 B2
(45) Date of Patent: Feb. 21, 2017

(54) DATA TRANSMISSION

(75) Inventors: Lei Du, Beijing (CN); Woonhee Hwang, Espoo (FI); Yi Zhang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 32 days.

(21) Appl. No.: 14/419,365

(22) PCT Filed: Aug. 3, 2012

(86) PCT No.: PCT/CN2012/079684
§ 371 (c)(1),
(2), (4) Date: Feb. 3, 2015

(87) PCT Pub. No.: WO2014/019235
PCT Pub. Date: Feb. 6, 2014

(65) Prior Publication Data
US 2015/0195831 A1   Jul. 9, 2015

(51) Int. Cl.
| | |
|---|---|
| *H04L 1/00* | (2006.01) |
| *H04W 72/04* | (2009.01) |
| *H04W 4/00* | (2009.01) |
| *H04W 74/00* | (2009.01) |
| *H04L 5/00* | (2006.01) |
| *H04W 68/00* | (2009.01) |

(52) U.S. Cl.
CPC ........ *H04W 72/0413* (2013.01); *H04L 5/0053* (2013.01); *H04W 4/005* (2013.01); *H04W 72/048* (2013.01); *H04W 74/004* (2013.01); *H04W 68/00* (2013.01)

(58) Field of Classification Search
CPC .................. H04B 7/2121; H04B 7/2123; H04J 2203/0069; H04Q 2213/394; H04W 72/04; H04W 72/12; H04W 76/00
USPC .......................... 370/329, 341, 229, 230, 235
See application file for complete search history.

(56) References Cited

U.S. PATENT DOCUMENTS

2013/0100895 A1* 4/2013 Aghili .................... H04W 4/00
370/329

FOREIGN PATENT DOCUMENTS

| | | |
|---|---|---|
| CN | 102223715 A | 10/2011 |
| CN | 102387495 A | 3/2012 |
| CN | 102448026 A | 5/2012 |
| CN | 102547658 A | 7/2012 |

* cited by examiner

*Primary Examiner* — Dady Chery
(74) *Attorney, Agent, or Firm* — Harrington & Smith

(57) ABSTRACT

A method and apparatus is provided wherein a request for data is received. It is determined if the request is associated with a relatively small data transmission. The requested data is transmitted in accordance with a first transmission method when it is determined that the request is associated with a relatively small data transmission.

16 Claims, 5 Drawing Sheets

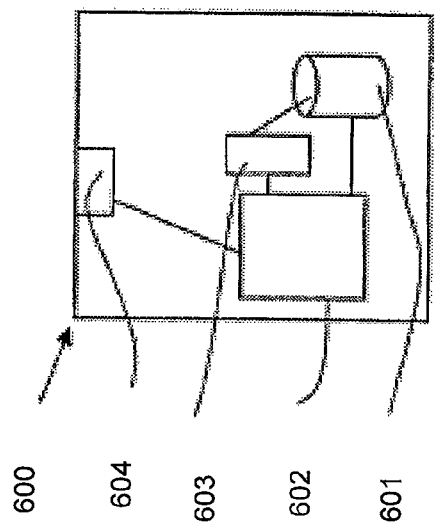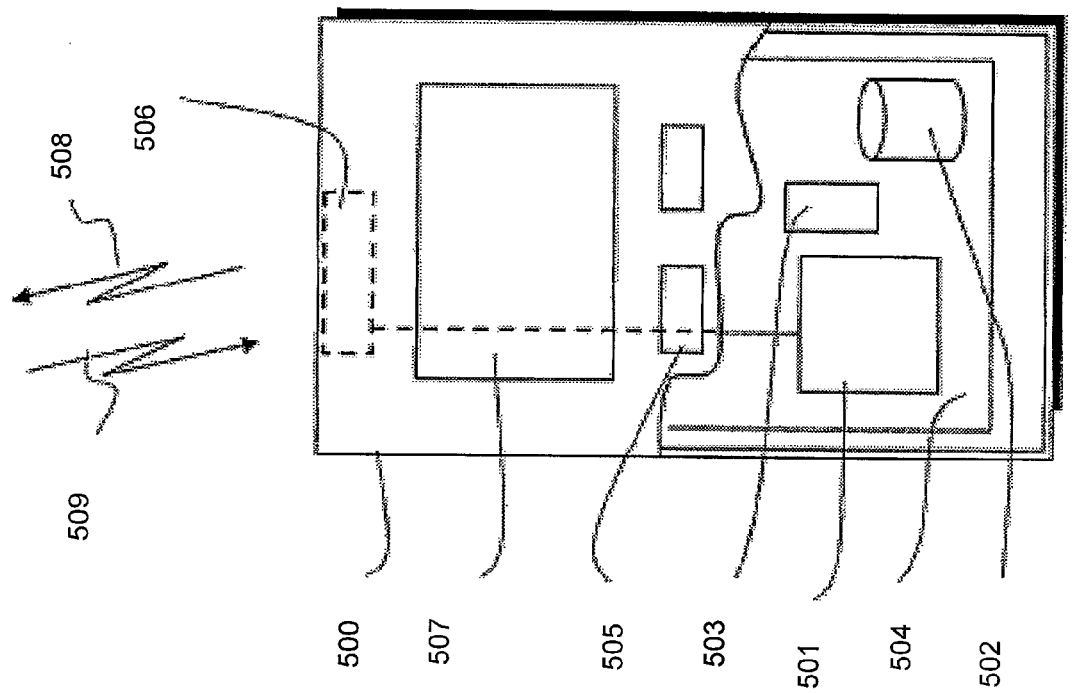

DATA TRANSMISSION

The present application relates to data transmissions and particularly but not exclusively to indicating small data transmissions.

A communication system can be seen as a facility that enables communications between two or more entities such as a communication device, e.g. mobile stations (MS) or user equipment (UE), and/or other network elements or nodes, e.g. Node B, enhanced Node B (eNodeB) or base transceiver station (BTS), associated with the communication system. A communication system typically operates in accordance with a given standard or specification which sets out what the various entities associated with the communication system are permitted to do and how that should be achieved.

Wireless communication systems include various cellular or otherwise mobile communication systems using radio frequencies for sending voice or data between stations, for example between a communication device and a transceiver network element. Examples of wireless communication systems may comprise public land mobile network (PLMN), such as global system for mobile communication (GSM), the general packet radio service (GPRS), the universal mobile telecommunications system (UMTS), and the long term evolution (LTE).

A mobile communication network may logically be divided into a radio access network (RAN) and a core network (CN). The core network entities typically include various control or management entities, and gateways for enabling communication via a number of radio access networks and also for interfacing a single communication system with one or more communication systems, such as with other wireless systems, such as a wireless Internet Protocol (IP) network, and/or fixed line communication systems, such as a public switched telephone network (PSTN). Examples of radio access networks may comprise the UMTS terrestrial radio access network (UTRAN), the GSM/EDGE radio access network (GERAN) and the evolved UMTS terrestrial radio access network (EUTRAN).

A geographical area covered by a radio access network is divided into cells defining a radio coverage provided by a transceiver network element or access point, such as a NodeB, eNodeB and/or base transceiver station. A single transceiver network element may serve a number of cells. A plurality of transceiver network elements is typically connected to a controller network element, such as a radio network controller (RNC) or other management entity.

User data in the form of packets is delivered over data radio bearers after signalling between network entities has been carried out to set up the communication. Typically in order for packets to be delivered random access procedure, radio resource control RRC connection setup, security activation and radio bearer configuration takes place. For mobile terminating calls, a paging message is used to trigger the radio access procedure.

According to a first aspect, there is provided a method comprising: receiving a request for data; determining if the request is associated with a relatively small data transmission; transmitting the requested data in accordance with a first transmission method when it is determined that the request is associated with a relatively small data transmission.

The method may further comprise: transmitting the transmitting the requested data in accordance with a second transmission method when it is determined that the request is not associated with a relatively small data transmission. A signalling overhead of the first transmission method may be less than a signalling overhead of the second transmission method.

The relatively small data transmission may be a machine type communication. The relatively small data transmission may be in the order of 1024 octets.

The determining may comprise determining if the request is associated with a relatively small data transmission indication. The small data transmission indication may further indicate the request for data. The request for data may be part of a paging message.

The first transmission method may comprises at least one of: transmitting the requested data using a radio resource control setup complete message; and transmitting the requested data using a radio resource control connection request message.

According to a second aspect, there is provided an apparatus comprising at least one processor, and at least one memory including computer program code, the at least one memory and the computer program code configured to, with the at least one processor, cause the apparatus at least to perform: determining if the request is associated with a relatively small data transmission; transmitting the requested data in accordance with a first transmission method when it is determined that the request is associated with a relatively small data transmission.

According to a third aspect, there is provided a method comprising: determining if a first message indicating a request for data is associated with a relatively small data transmission; associating a second message indicating the request for data with a relatively small data transmission when it is determined that the first message is associated with a relatively small data transmission.

The determining may comprise determining if the first message is associated with a small data transmission indication. The small data transmission indication may be part of the request for data. At least one of the first message and second message may be a paging message.

When the second message is a paging message, the method may further comprise: determining that the relatively small data transmission associated with the second message is for all devices identified by the second message; and providing a relatively small data indication in the paging message.

When the second message is a paging message, the method may further comprise: identifying a device with which the relatively small data transmission indication is associated; and providing a relatively small data transmission indication in a paging record corresponding to the identified device in the paging message.

According to a fourth aspect, there is provided an apparatus comprising at least one processor, and at least one memory including computer program code, the at least one memory and the computer program code configured to, with the at least one processor, cause the apparatus at least to perform: determining if a first message indicating a request for data is associated with a relatively small data transmission; associating a second message indicating the request for data with a relatively small data transmission when it is determined that the first message is associated with a relatively small data transmission.

The apparatus may be one of an access node and a management entity.

According to a fifth aspect, there is provided a method comprising: associating a message indicating a request for data with a relatively small data transmission; determining at a device if the message is associated with a relatively small data transmission; and transmitting the requested data in accordance with a first transmission method when it is determined that the request is associated with a relatively small data transmission.

According to a sixth aspect, there is provided a system comprising: a network entity configured to associate a message indicating a request for data with a relatively small data transmission; and a device configured to determine if the message is associated with a small data transmission and transmit the requested data in accordance with a first transmission method when it is determined that the request is associated with a relatively small data transmission.

The network entity may be one of a management entity and an access point.

When the network entity is an access node, the system may further comprise: a management entity configured to associate an initial message indicating the request for data with a relatively small data transmission; and the access point is further configured to: determine that the initial message is associated with a relatively small data transmission.

Embodiments will now be described in further detail, by way of example only, with reference to the following examples and accompanying drawings, in which.

FIG. 5 showing a schematic, partially sectioned view of a communication device; and FIG. 6 shows an example of a control apparatus.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features/structures that have not been specifically mentioned.

Reference will now be made in detail to the embodiments of the present invention, examples of which are illustrated in the accompanying drawings.

Figure 1:
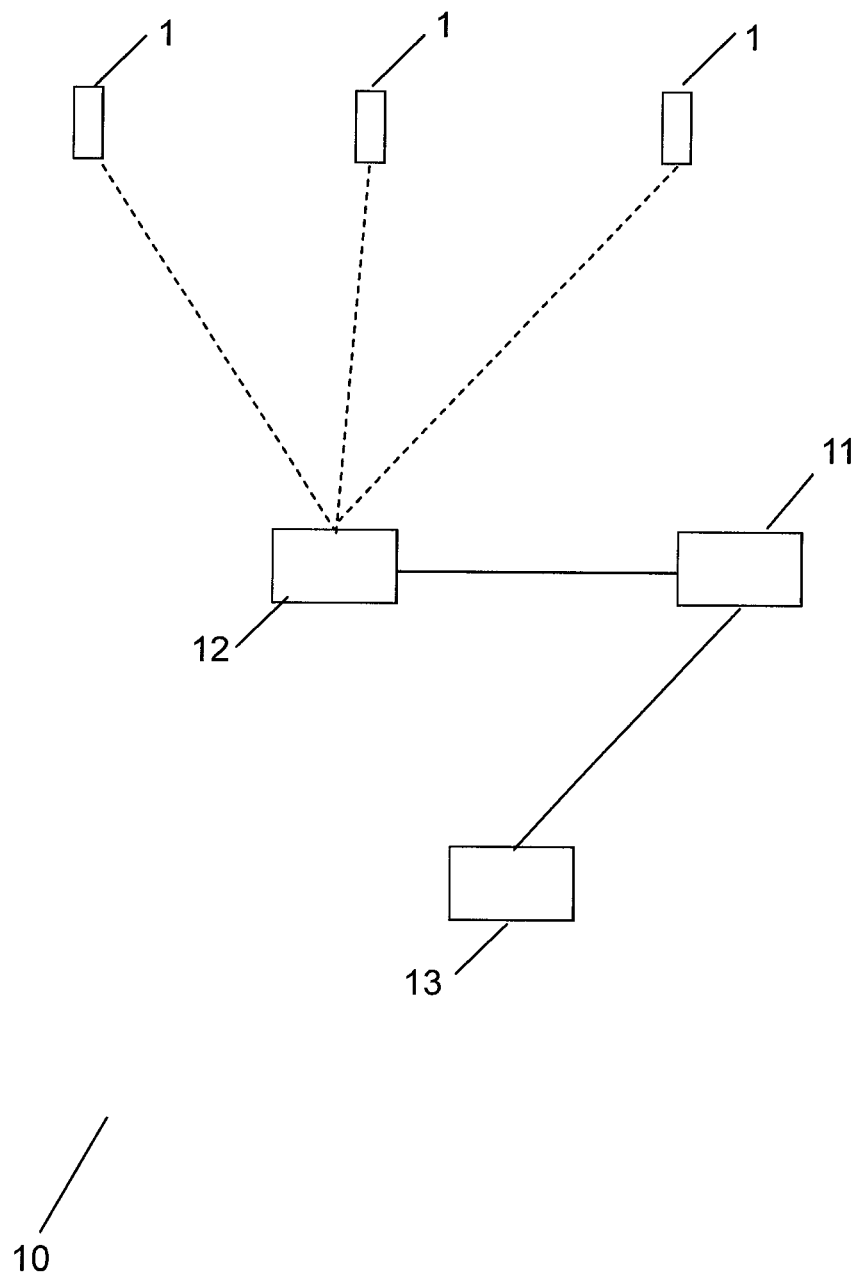
FIG. 1 shows an example of a communication system in which some embodiments may be implemented.

FIG. 1 shows an example of a mobile communication system 10. Mobile communications apparatus or user equipment (UE) 1 can typically access wirelessly a mobile network system via at least one access point 12 or similar wireless transmitter and/or receiver node of the access system. An access point 12 may for example be a Node B, base station and/or eNodeB. An access point site typically provides one or more cells of a cellular system. In the FIG. 1 example the access point 12 is configured to provide a cell, but could provide, for example, three sectors, each sector providing a cell. Each mobile communications apparatus 1 and access point 12 may have one or more radio channels open at the same time and may communicate with more than one other station. In addition to communications with the access point 12, the communications apparatus 1 may be in direct communication with the other communication apparatus.

An access point 12 in some embodiments may carry out some control functionality. Additionally, the access point 12 may be in communication with a management entity 11 such as for example a Mobility Management Entity (MME) or SGSN.

The management entity 11 may be connected to one or more further access points (not shown). The user equipment 1, access point 12 and management entity 11 may be considered to collectively comprise a radio access network (RAN).

The network of FIG. 1 may further include one or more gateways entities (not shown) for communicating with further networks such as an external IP network. A communication system may be provided by one or more interconnected networks and the elements thereof, and one or more gateway nodes may be provided for interconnecting various networks. The gateways may facilitate communication with entities on the further communication networks for example a server 13. In some embodiments the server 13 may be able to communicate with the management entity 11, either via a gateway or by another means.

The communications apparatus 1 may be provided with wireless access to the communication system based on various access techniques, such as code division multiple access (CDMA), wideband CDMA (WCDMA), time division multiple access (TDMA), frequency division multiple access (FDMA), Orthogonal Frequency-Division Multiple Access (OFDMA), space division multiple access (SDMA), and so on.

In the mobile communication system of FIG. 1, data transmissions may be of varying sizes. Specifically the mobile communication system 10 may carry small data transmissions (SDT). An example of these small data transmission may be a machine type communication (MTC). MTC is a form of data communication which involves one or more entities that do not necessarily need human interaction. It may be characterized by some MTC features, for example a large number of devices, small data transmission, low mobility etc. and generally transmits small blocks of data.

For example, metering devices are typically monitored and controlled by a centralized entity outside or inside a network operator system. Due to the need for centralized control, the centralized entity will inform or poll the metering device when it needs measurement information rather than the metering device autonomously sending measurements. Depending on the nature of the metering application, low latency responses are sometimes required (metering for high pressure pipelines for example). To accomplish this, the centralized entity will need to inform the metering device when it needs a measurement. The server of FIG. 1 may in some embodiments be an MTC server 13 providing such a centralised entity and one or more of the user equipment UE 1 may be MTC devices, for example metering devices.

Small data transmission however is not restricted to machine type communications but may take place in various applications that may or may not require human interaction. Small data transmissions may be considered transmissions of relatively small data as compared to other data such as communication data. For example, in some embodiments, a small data transmission may be considered a transmission in the order of 1024 octets. It will be appreciated that while machine type communications have been exemplified in the following description, embodiments may apply to other small data transmissions.

In order to set up and carry out a communication over data radio bearer, signalling procedures such as random access procedure, radio resource control RRC connection setup, security activation and the radio bearer configuration, are carried out regardless of the packet size to be delivered. This costs network resources and introduces overheads to the system. Given the relatively small data of small data transmission, for example tens of bytes, the signalling overhead becomes more significant. One option to address this overhead is the optimisation of transmissions for small data transmissions.

Some options for the optimisation of small data transmission may include, for example sending the small data as part of the access procedure, for instance using Msg3 in LTE, or an RRC connection setup complete message. However user equipment UE and/or MTC transmitting devices may not be aware that they are about to transmit small data transmissions and should use such optimisation procedures. For example using an RRC connection setup complete message to deliver small data could save the radio bearer setup signalling. In another example, using Msg3 to transmit the small data may also save the RRC connection setup message.

A UE or MTC device may be capable of autonomously determining whether to implement optimised small data transmission. For example, the MTC device may be aware of the size of the data and implement small data transmission in response to the data size or the MTC device may be programmed to always implement small data transmissions. The MTC devices may not be aware of the capabilities of the serving access point however, and such autonomously implementation may result in loss of data if the serving access point and/or management entity does not support small data transmissions. In other implementations, MTC devices may not autonomously use small data transmissions as they are not aware of whether or not associated network entities support small data transmissions.

Some embodiments may provide a method of enabling a network to trigger optimized small data transmission in a transmitting device. In some embodiments, small data transmissions may only be triggered when a supporting network entity (for example an access point and/or management entity) supports the small data transmissions. The optimised small data transmissions may reduce unnecessary signalling overhead.

In embodiments, a requesting entity such as an MTC server may be working as a centralized entity to control and process reports from devices on the radio access network, for example MTC devices. The requesting entity may have information about the requested data (for example and expected size of the response data) when sending out a request for such data. For example, the MTC server could know the reported gas/electricity/water volume is not of big size.

In embodiments, a requesting entity may provide an indication with the request indicating that a device is to use optimized small data transmission in the transmission of the requested data. This indication may provide a trigger for small data optimisation in the device.

In some embodiments a network entity, for example the management entity and/or an access point may recognise this small data transmission indication from the requesting entity and incorporate the small data transmission indication in the request sent from the network entity. In some embodiments the small data transmission indication may be including the message if the network entity and/or entities can support small data transmissions. For example the network entity may provide the request in a paging message and include the indication of small data optimisation in the paging message. In some embodiments, the device will implement optimised small data transmission in response to the indication. In other embodiments, the device may further determine whether or not to implement optimised small data transmission.

In some embodiments the message may be a non-access stratum message sent by a management entity of the network. In other or additional embodiments, the message may be an access stratum message sent by an access point.

Figure 2:
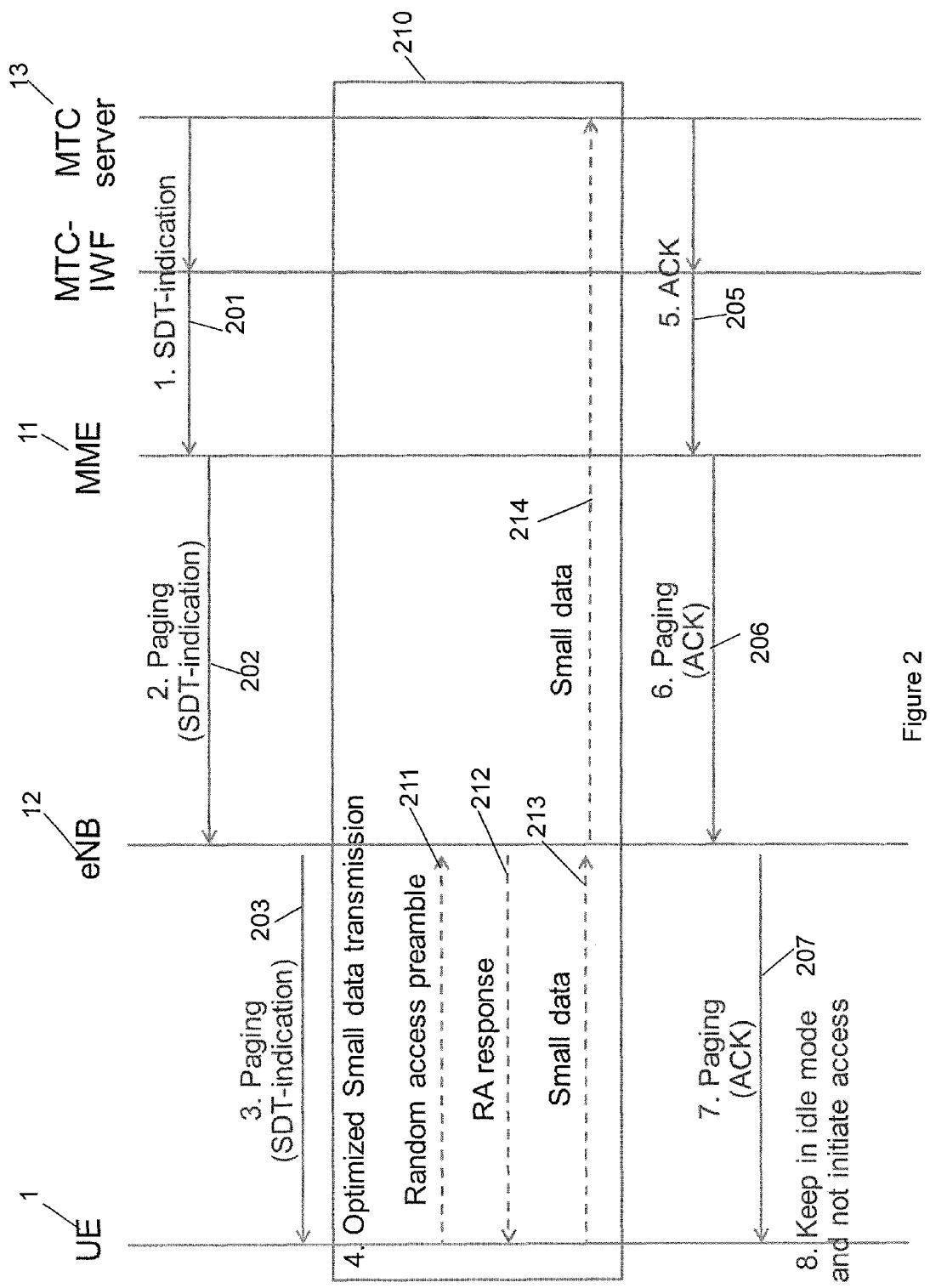
FIG. 2 shows a signalling diagram depicting the signalling steps of some embodiments.

FIG. 2 shows an example of the signalling between a requesting entity and device over a communication network. It will be appreciated that the network entities of FIG. 2 may be similar to those in FIG. 1.

FIG. 2 shows the signalling flows between a MTC server 13, management device such as a mobile management entity MME 11, eNodeB 12 and user equipment UE 1.

In FIG. 2, an MTC server 13 generates a reporting message requesting that MTC devices such as one or more of the UEs 1 report data to the MTC server 13. The reporting message may include an indication or trigger that indicates that the data to be sent by the UE 1 is a small data transmission. The MTC server 13 transmits this reporting message 201.

It will be appreciated that the reporting message may be sent to the radio access network via any suitable interface and/or network entity. In the example of FIG. 2, the reporting message is received by a management entity MME 11.

The MME identifies the indication and/or trigger in the reporting message and sets a corresponding indication and/or trigger in a paging message to an access point eNodeB 202 forwarding the reporting request at 202.

The access point eNodeB 12 receives the paging message from the MME 11 and identifies the indication and/or trigger in that message. The eNodeB 12 may then set a corresponding indication and/or trigger in or associated with a paging message forwarding the reporting request to one or more UEs. The paging request is sent to the UE 1 at 203.

The UE 1 may identify the indication or trigger and carry out optimised small data transmission in response thereto in the reporting of the requested data. The optimised small data transmission is carried out at 210.

It will be appreciated that the UE 1 may be capable of transmitting data in accordance a first transmission method which may correspond to a transmission method for small data transmissions. The UE1 may further be able to transmit data according to a second transmission method. The second transmission method may correspond to a method used in the transmission data this not small data or when the UE 1 has not received a small data transmission indication.

In some embodiments, the MTC server may wish to acknowledge the reported data. In the embodiment of FIG. 1, the MTC server 13 acknowledges the reporting data to the MME 11 at 205.

The MME 11 inserts the acknowledgment into a paging message for the eNodeB 12 and sends the paging message to the eNodeB 12 at 206.

The eNodeB 12 receives the paging message from the MME 11 and insert the acknowledgement in the paging message to the UE 1 at 207.

The UE 1 receives the paging message from the eNodeB including the acknowledgement. It will be appreciated that the paging message including the acknowledgement may be such that the UE remains in idle mode and does not understand the paging message as a request to initiate access with the RAN.

It is appreciated that while FIG. 2 shows the SDT indication being sent in the paging message from the access point 12, in other embodiments, the SDT indication may be sent to the UE in a paging message from the management entity 11. This message may be sent via the access point 12 in some embodiments. It will appreciated that the SDT may be sent in a non access stratum from the management entity and/or may be send in an access stratum by the access point 11.

Embodiments relating to each of the messages will now be discussed.

201: Reporting Request:

When the MTC server 13 requires reporting information from the UE 1, the MTC server 13 generates a reporting request including a small data transmission indication and sends the reporting request 201 to the communication network. The reporting request may be applicable for down link triggered small data transmission (SDT).

In some embodiments, the indication may be an explicit small data transmission SDT indication. In other embodiments, a reporting trigger from the MTC server 13 may also trigger optimised small data transmissions.

It will be appreciated that while the MTC server 13 is shown as sending the reporting request and indication to a management entity MME 11 of a radio access network RAN of the UE 1, the reporting request may be sent via an appropriate further network entity and/or interface. For example in some embodiments the MTC server 13 may send the indication to RAN side for example via a T5a/b/c interface between MTC-IWF and mobile management entity MME/serving GPRS support node SGSN/mobile switching centre MSC depending on the communication network architecture.

For example, the indication (or trigger) may be delivered from the MTC server 13 to a machine type communication interworking function (MTC-IWF) via a control interface between the core network via the MTC-IWF and the MTC server (known as MTCsp), and then further sent to the MME 11 via T5a/T5b. It will be appreciated that the delivery route of the indication will depend on the architecture design of the network.

While the indication is described as being including in a reporting request, it will be appreciated that the indication and/or reporting trigger may be delivered using any message between a requesting device and management device.

In some embodiments, the indication may include further information. For example, in a case where the MTC server 13 likes to indicate more information than a single trigger, it could include a type of requested information, for example gas/electricity/water, or the requested information itself. In other or further embodiments, the type of requested information or the requested information itself may form the indication.

202: Paging Message from Management Entity:

The MME 11 may receive the indication and reporting request from the MTC server 13. The MME 11 may identify or recognise the small data transmission indication in the reporting request. The MME 11 sets a small data transmission indication in a paging message. The paging message may be sent to the access point eNodeB 12 serving the UE 1 to which the reporting request is addressed and sends this paging message 202 to the eNodeB 12. Alternatively, the paging message may be sent to the UE via the eNodeB 12.

When a SDT-indication is set in the paging message, it means that the MTC device 1 being paged is supposed to report MTC records or is allowed to send the data using optimized small data transmission.

Table 1 shows an example of a paging message sent by the MME 11 and may be used to page a UE in one or several tracking areas.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 to < maxnoofTAIs > | | | EACH | ignore |
| >>TAI | M | | 9.2.3.16 | | — | |
| CSG Id List | | 0..1 | | | GLOBAL | ignore |
| >CSG Id | | 1 to < maxnoofCSGId > | 9.2.1.62 | | — | |
| Paging Priority | O | | 9.2.1.78 | | YES | ignore |
| CHOICE | | | | | | |
| >SDT-indication | O | | | If present, UE is allowed to use optimized small data transmission | | |
| >SDT-ACK | O | | | To acknowledge the correct reception of small data | | |

| Range bound | Explanation |
|---|---|
| maxnoofTAIs | Maximum no. of TAIs. Value is 256. |
| maxnoofCSGIds | Maximum no. of CSG Ids within the CSG Id List. Value is 256. |

In some embodiments, the message may include one of an SDT-indication and SDT-Ack which, if present indicates that a UE is allowed to optimise small data transmissions or that small data is acknowledged respectively.

203: Paging Message from Access Point 12:

Once the paging message 202 from the MME 11 has been received at the access point eNodeB 12, the eNodeB 12 identifies or recognises the small data transmission indication in the paging message from the MME 11. The eNodeB 12 may then set a corresponding small data transmission indication in one or more paging messages to one or more UEs 1. The eNodeB then sends a paging message 203 including or associated with the small data transmission indication to the relevant UEs 1.

Figure 3:
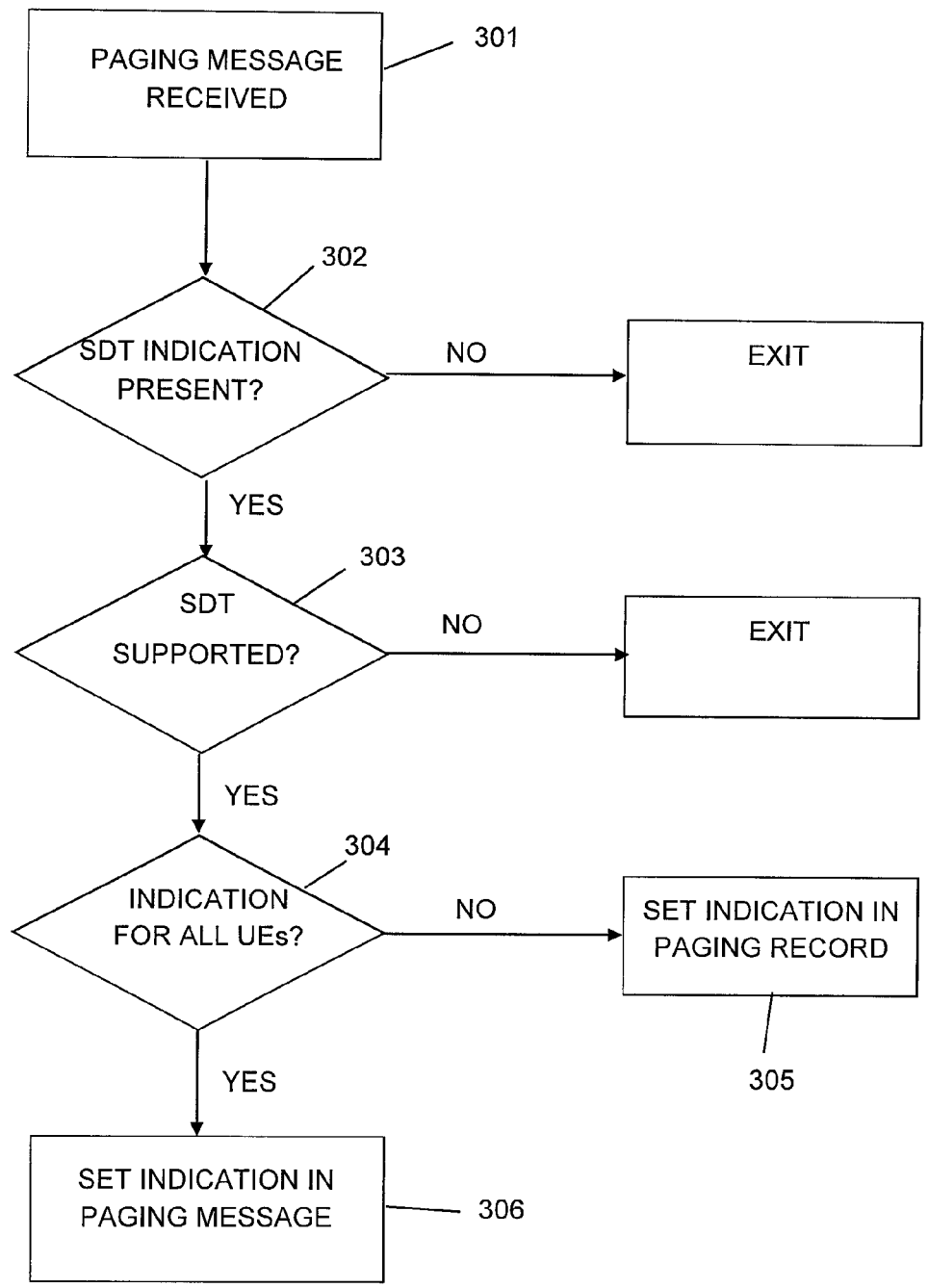
FIG. 3 shows a flow diagram of the method steps carried out by a device in accordance with some embodiments.

FIG. 3 shows an example of a method carried out by the eNodeB 12 on receipt of a paging message from the MME 11 according to some embodiments.

At step 301, a paging message is received from a management entity such as an MME 11.

At step 302, it is determined whether a small data indication is present in the paging message from the MME 11. If the indication is present, the method proceeds to step 303. If there is no indication present the method exits. It will be appreciated that if there is no indication, a paging message may be generated and sent by the access point without any indication or trigger.

At step 305, an SDT-indication may be included in a paging-record for the individual or subset of UEs being paged in the paging message. If the paging record is for a subset, for example identified by a group identity, the SDT-indication applies for all the UEs associated with the group identity.

If all the UEs in the paging message are paged with SDT-indication the method proceeds to step 306 where the SDT-indication may be included in the paging message.

In another embodiment, the small data transmission indication may be set outside the paging record of the paging message by the eNodeB 12. For example, in some embodiments, in case that all the paging records in one paging message include the indication, the indication could be set outside the paging record information element (IE) to minimize the signalling overhead.

Table 2 shows an example of a paging message sent from the access point 12.

TABLE 2

```
- - ASN1START
Paging ::=                      SEQUENCE {
   pagingRecordList               PagingRecordList        OPTIONAL,    - - Need ON
   systemInfoModification         ENUMERATED {true}       OPTIONAL,    - - Need ON
   etws-Indication                ENUMERATED {true}       OPTIONAL,    - - Need ON
   SDT-indication                 ENUMERATED {true}       OPTIONAL,    - -
Need ON : Alt2
   nonCriticalExtension           Paging-v890-IEs         OPTIONAL
}
Paging-v890-IEs ::=             SEQUENCE {
   lateNonCriticalExtension       OCTET STRING            OPTIONAL,    - -
Need OP
   nonCriticalExtension           Paging-v920-IEs         OPTIONAL
}
Paging-v920-IES ::=             SEQUENCE {
   cmas-Indication-r9             ENUMERATED {true}       OPTIONAL,    - - Need ON
   nonCriticalExtension           SEQUENCE { }            OPTIONAL     - -
Need OP
}
PagingRecordList ::=            SEQUENCE (SIZE (1..maxPageRec)) OF PagingRecord
PagingRecord ::=                SEQUENCE {
   ue-Identity                    PagingUE-Identity,
   cn-Domain                      ENUMERATED {ps, cs},
   CHOICE {
   SDT-indication                 ENUMERATED {true}       OPTIONAL,    - -
Need ON : Alt1
   SDT-ACK                        ENUMERATED {true}       OPTIONAL,    - -
Need ON
   }
   ...
}
PagingUE-Identity ::=           CHOICE {
   s-TMSI                         S-TMSI,
   imsi                           IMSI,
   ...
}
IMSI ::=                        SEQUENCE (SIZE (6..21)) OF IMSI-Digit
IMSI-Digit ::=                  INTEGER (0..9)
- - ASN1STOP
```

At step 303 it is determined whether the eNodeB12 supports optimised small data transmission. If yes, the method proceeds to step 304, if no, the method exits. It will be appreciated that the eNodeB will only set a small data transmission indication or trigger if the eNodeB supports optimised small data transmissions. If the eNodeB 12 does not support small data transmissions, the eNodeB 12 will disregard the indication.

At step 304 it is determined whether the indication is for one or more individual UEs or for all the UE in the paging message. If the indication is for one or more individual UEs, the method proceeds to step 305.

As can be seen from table 2, the SDT indication may be including in the paging message ("Paging:=") if the indication applies to all UEs being paged. Alternatively, the SDT indication may be included in an individual paging record ("PagingRecord::=") if the indication only applies to an individual UE or a group of UEs identified by the paging record.

203 and 210: Paging Message at UE and Optimised Small Data Transmission:

When the UE receives the paging message from the access node, it detects whether an indication to optimise small data transmission is present in the paging message or associated with the paging message. The UE further reports information such as MTC information in response to the paging message using optimised small data transmission.

The uplink data, for example reporting data from the UE is provided back to the MTC server 11.

Figure 4:
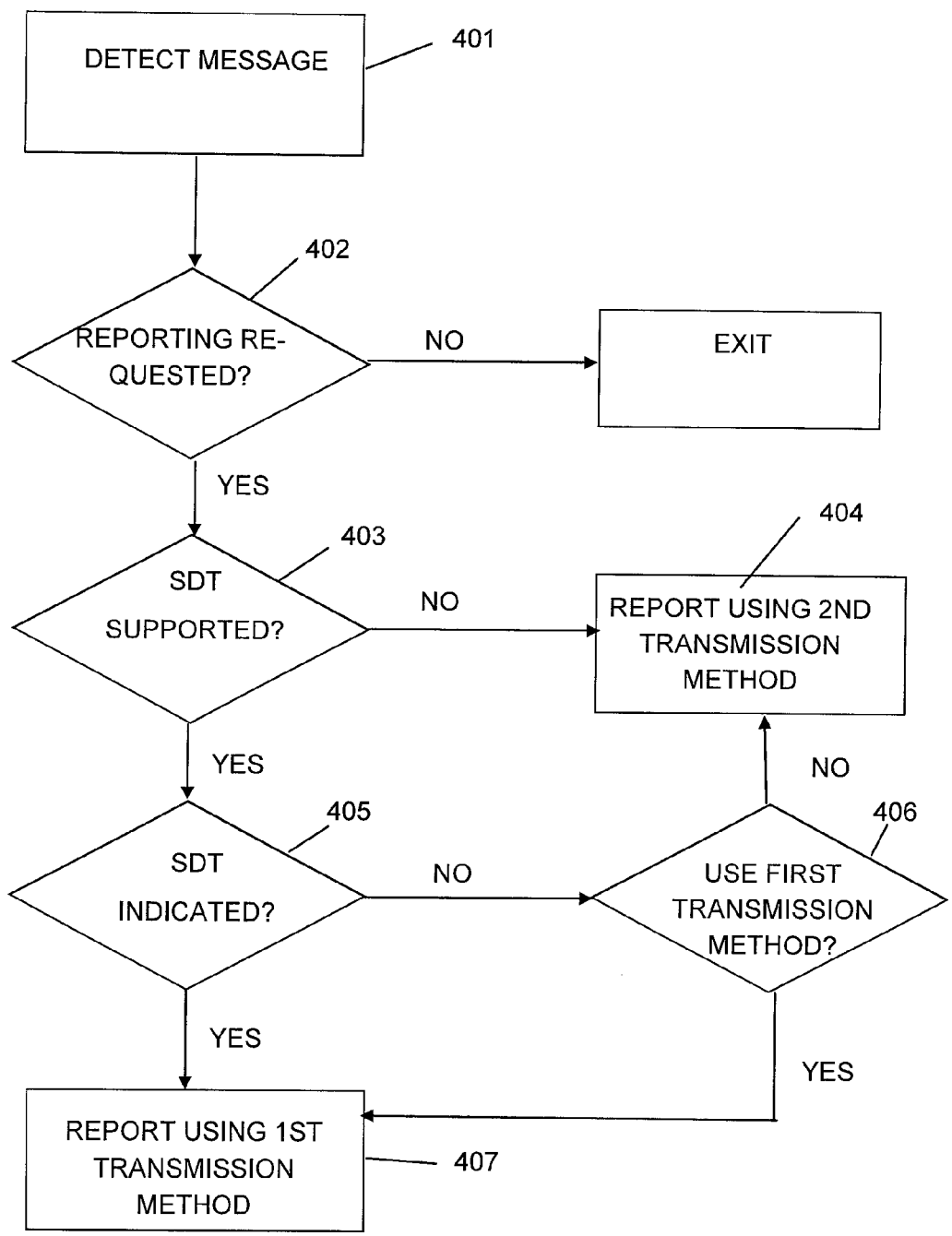
FIG. 4 shows a flow diagram of the method steps carried out by a network entity in accordance with some embodiments.

FIG. 4 shows an example of the method steps that may be carried out by a UE1 in accordance with some embodiments.

At step 401, the MTC device UE 1 monitors the paging occasions and detects a paging record for itself. The method then proceeds to step 402.

At step 402, it is determined whether reporting is requested from the UE 1. If reporting is not requested, the method exits. If it is requested, the method proceeds to step 403.

At step 403, it is determined whether optimised small data transmissions is supported by the UE 1. If it is supported, the method proceeds to step 405. If it is not supported the method proceeds to step 404.

It will be appreciated the UE may be capable of transmitting data using a first transmission message corresponding to a small data specific transmission and a second transmission method corresponding to general data transmission. For example the signalling overhead of the first transmission method may be less than the signalling overhead of the second transmission method.

At step 404, the UE 1 may report the requested records it has or has acquired using the second transmission method. This may correspond to non-optimised small data transmissions in some embodiments.

At step 405, it is determined whether a SDT indication is set in the paging record. It will be appreciated that in some embodiments, the reporting request may form the SDT indication or trigger and step 405 will be omitted.

If the SDT indication is present, the method proceeds to step 407, if the SDT trigger is not present, the method proceeds to step 406.

It will be appreciated that while steps 403 and 405 have been illustrated as separate steps, in some embodiments, the detection of a small data transmission indication may indicate both that a data transmission is requested (reporting request) and that small data transmission is requested.

At step 406, the UE may make a determination of whether to implement optimised SDT based on internal logic of the UE. For example, the UE 1 may detect characteristic of the uplink packets and based on some logic in the non-access stratum NAS, trigger uplink small data transmissions independently of the SDT indication. If the UE 1 decides not to use optimised SDT, the method proceeds to step 404. If the UE 1 decides to use optimised SDT, the method proceeds to step 407.

At step 407, the UE 1 reports the requested data using optimised SDT. It will be appreciated that in some embodiments, the UE 1 may have stored the reported data previously, in other embodiments, the UE 1 may carry out operations such as measurement operations to generate the reported data. The optimized small data transmission method could be any optimised small data transmission, for example using Msg3, RRC connection setup complete etc.

205, 206 and 207: Acknowledgment:

In some embodiments, the network may use paging messages to acknowledge the reception of the data from the UE. However it will be appreciated that such acknowledgement may be optional.

It will also be appreciated that the interface used for the MTC server 13 to send an acknowledgment ACK to the MME 11 is dependent on system architecture and may be similar to that used to send the reporting request at 201.

In some embodiments, upon receiving the ACK from MTC server 13, the MME 11 may include the ACK in a paging message to the eNodeB 12 if there is no available RRC connection to deliver the ACK information.

The eNodeB 12 may include the ACK in a paging message for the UE.

When a UE 1 detects a paging message destined for itself together with an ACK, the UE 1 determined that the paging message is to acknowledge the correct reception of optimized small data transmission and does not initiate access for this paging.

A possible mobile communication device for transmitting in uplink and receiving in downlink in accordance with the UE 1 and/or MTC device 1 as described above, will now be described in more detail with reference to FIG. 5 showing a schematic, partially sectioned view of a communication device 500. An appropriate communication device may be provided by any device capable of sending radio signals to and/or receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like.

A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Non-limiting examples of content data include downloads, television and radio programs, videos, advertisements, various alerts and other information.

The device 500 is configured to receive signals in the downlink 509 over an air interface via appropriate apparatus for receiving and to transmit signals in the uplink 508 via appropriate apparatus for transmitting radio signals. In FIG. 5 the transceiver apparatus is designated schematically by block 506. The transceiver apparatus 506 may be provided for example by means of a radio part and associated antenna arrangement. The antenna arrangement may be arranged internally or externally to the mobile device.

A mobile communication device is also provided with at least one data processing entity 501, at least one memory 502 and other possible components 503 for use in software and hardware aided execution of tasks it is designed to perform, including control of access to and communications with base stations and/or other communication devices. The data processing, storage and other relevant apparatus can be provided on an appropriate circuit board and/or in chipsets. This apparatus is denoted by reference 504.

The user may control the operation of the mobile device by means of a suitable user interface such as key pad 505, voice commands, touch sensitive screen or pad, combinations thereof or the like. A display 507, a speaker and a microphone can be also provided. Furthermore, a communication device may comprise appropriate connectors (either wired or wireless) to other devices and/or for connecting external accessories, for example hands-free equipment, thereto.

It will be appreciated the communications device 500 of FIG. 5 may be configured to carry out the operations and/or any program or method steps of the UE 1 and/or MTC device 1 as described herein.

FIG. 6 shows an example of a control apparatus 600 for a communication system, for example to be coupled to and/or for controlling a base station. In some embodiments a base station may comprise an integrated control apparatus and some other embodiments the control apparatus can be provided by a separate network element. The control apparatus can be interconnected with other control entities. The control apparatus and functions may be distributed between a plurality of control units. In some embodiments each base station can comprise a control apparatus. In alternative embodiments, two or more base stations may share a control apparatus.

The arrangement of the control depends on the standard, and for example in accordance with the current LTE specifications no separate radio network controller is provided. Regardless of the location, the control apparatus 30 can be understood as providing control on communications in the service area of at least one base station.

The control apparatus 600 can be configured to provide control functions in accordance with embodiments described below. For this purpose the control apparatus can comprise at least one memory 601, at least one data processing unit 602, 603 and an input/output interface 604. Via the interface the control apparatus can be coupled to a base station or other parts of the base station to cause operation of the base station in accordance with the below described embodiments. The control apparatus can be configured to execute an appropriate software code to provide the control functions.

It will be appreciated that the control apparatus 600 may be implemented in an access point and/or management entity of the above description and be configured to carry out any associated method or program steps.

While an SDT indication has been described in the foregoing it will be appreciates that the indication may be a set bit or flag in some embodiments. In other embodiments, the indication may identify a type of data requested. For example the indication may indicate a variant such as for example 'gas' or 'water' or 'electricity'. In this embodiment, the request information itself could be included in the paging message instead of or in addition to the SDT indication. The UE may for example be determine that small data transmission is to be used in association with a particular variant.

It will also be appreciated that while FIG. 2 shows signalling flows between an MTC server 13, MME 11, eNodeB 12 and UE 1, the signalling flows may be between any requesting entity, management entity, access point and communication device. Additionally the functionality of some of the entities may be combined in some embodiments. For example, in some embodiments, the functionality of the management entity and access point may be combined.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium.

An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

Some aspects of the embodiments may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It is also noted herein that while the above describes exemplifying embodiments of the invention, there are several variations and modifications which may be made to the disclosed solution without departing from the scope of the present invention.

What is claimed is:

1. A method comprising:
  receiving a request for data as part of a paging message;
  determining if the request is associated with a relatively small data transmission, comprising determining if the request is associated with a relatively small data transmission indication that is set outside a paging record of the paging message; and
  transmitting the requested data in accordance with a first transmission method in response to a determination that the request is associated with the relatively small data transmission indication that is set outside a paging record of the paging message.

2. The method of claim 1 further comprising:
  transmitting the transmitting the requested data in accordance with a second transmission method in response to it being determined that the request is not associated with a relatively small data transmission.

3. The method of claim 2 wherein a signalling overhead of the first transmission method is less than a signalling overhead of the second transmission method.

4. The method of claim 1 wherein the relatively small data transmission is a machine type communication.

5. The method of claim 1 wherein the relatively small data transmission is in the order of 1024 octets.

6. The method of claim 1 wherein the small data transmission indication further indicates the request for data.

7. The method of claim 1 wherein the first transmission method comprises at least one of:
  transmitting the requested data using a radio resource control setup complete message; and transmitting the requested data using a radio resource control connection request message.

8. A computer program product comprising a non-transitory computer-readable storage medium bearing computer program code embodied therein for use with a computer, the computer program code comprising code for performing the method of claim 1.

9. An apparatus comprising at least one processor, and at least one memory including computer program code, the at least one memory and the computer program code configured to, with the at least one processor, cause the apparatus at least to perform:
  receiving a request for data as part of a paging message;
  determining if the request is associated with a relatively small data transmission, comprising determining if the request is associated with a relatively small data transmission indication that is set outside a paging record of the paging message;
  transmitting the requested data in accordance with a first transmission method when it is determined that the request is associated with a relatively small data transmission.

10. A method comprising:
  determining if a first message indicating a request for data is associated with a relatively small data transmission, comprising determining if the first message is associated with a small data transmission indication;
  associating a second message indicating the request for data with a relatively small data transmission in response to it being determined that the first message is associated with the small data transmission indication, wherein the second message is a paging message;
  setting, outside a paging record of the paging message, the small data transmission indication in the paging message; and
  transmitting the paging message.

11. The method of claim 10 wherein the small data transmission indication is part of the request for data.

12. The method of claim 10, the method further comprising:
  determining that the relatively small data transmission associated with the second message is for all devices identified by the second message; and
  providing the relatively small data indication in the paging message.

13. The method of claim 10, the method further comprising:
  identifying a device with which the relatively small data transmission indication is associated; and
  providing the relatively small data transmission indication in the paging message.

14. A computer program product comprising a non-transitory computer-readable storage medium bearing computer program code embodied therein for use with a computer, the computer program code comprising code for performing the method of claim 10.

15. An apparatus comprising at least one processor, and at least one memory including computer program code, the at least one memory and the computer program code configured to, with the at least one processor, cause the apparatus at least to perform:
  determining if a first message indicating a request for data is associated with a relatively small data transmission, comprising determining if the first message is associated with a small data transmission indication;
  associating a second message indicating the request for data with a relatively small data transmission in response to it being determined that the first message is associated with the small data transmission indication, wherein the second message is a paging message;
  setting, outside a paging record of the paging message, the small data transmission indication in the paging message; and
  transmitting the paging message.

16. The apparatus of claim 15 wherein the apparatus is one of an access node and a management entity.

* * * * *